(12) United States Patent
Grinderslev

(10) Patent No.: US 8,876,407 B2
(45) Date of Patent: Nov. 4, 2014

(54) CABLE ANCHORING SYSTEM

(75) Inventor: Soren Grinderslev, Hummelstown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 727 days.

(21) Appl. No.: 13/115,652

(22) Filed: May 25, 2011

(65) Prior Publication Data

US 2012/0301085 A1    Nov. 29, 2012

(51) Int. Cl.
  *G02B 6/36*   (2006.01)
  *G02B 6/38*   (2006.01)

(52) U.S. Cl.
  CPC ..................................... *G02B 6/3887* (2013.01)
  USPC .................. 385/86; 385/69; 385/87

(58) Field of Classification Search
  USPC ....................................................... 385/86–87
  See application file for complete search history.

(56) References Cited

U.S. PATENT DOCUMENTS

| | | | |
|---|---|---|---|
| 4,815,808 A | 3/1989 | Honma et al. | |
| 4,964,685 A | 10/1990 | Savitsky et al. | |
| 5,062,683 A * | 11/1991 | Grois et al. | 385/87 |
| 5,088,804 A | 2/1992 | Grinderslev | |
| 5,208,887 A | 5/1993 | Grinderslev | |
| 5,644,673 A * | 7/1997 | Patterson | 385/138 |
| 7,241,056 B1 * | 7/2007 | Kuffel et al. | 385/60 |
| 7,331,719 B2 | 2/2008 | Manning et al. | |
| 2009/0032282 A1 | 2/2009 | Sedor et al. | |

FOREIGN PATENT DOCUMENTS

| | | |
|---|---|---|
| EP | 0922974 A2 | 6/1999 |
| JP | 60250312 | 12/1985 |
| KR | 100944702 | 6/2009 |
| WO | 2009148797 | 12/2009 |

OTHER PUBLICATIONS

Annex to Form PCT/ISA/206, International Application No. PCT/US2012/039029, International Filing Date May 23, 2012.

* cited by examiner

*Primary Examiner* — Hemang Sanghavi
(74) *Attorney, Agent, or Firm* — Merchant & Gould P.C.

(57) ABSTRACT

An optical fiber connector for terminating an optical fiber cable containing a buffered fiber, said connector comprising: (a) a housing having a front and rear orientation; (b) an anchor at the rear of said housing, said anchor comprising exterior threads and a collet and defining at least a first passage configured to receive said buffered fiber; (c) a nut having internal threads and being adapted for threaded engagement with said anchor; and wherein said nut and collet cooperate to define an interference portion in which said nut deflects said collect inward to constrict said first passage as said nut is threaded onto said anchor.

22 Claims, 6 Drawing Sheets

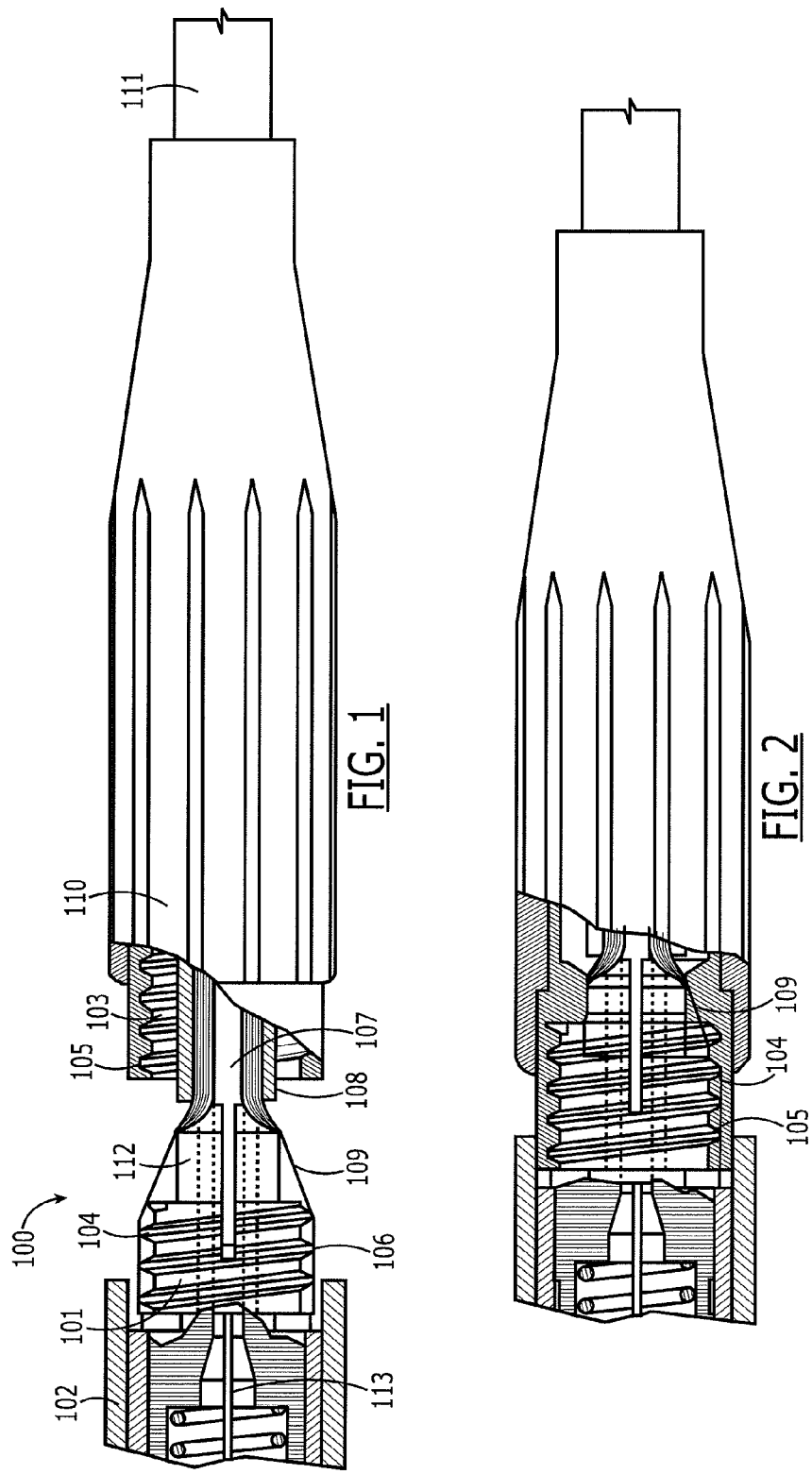

CABLE ANCHORING SYSTEM

FIELD OF INVENTION

This invention relates generally to a cable anchor system for an optical fiber connector, and, more specifically, to a cable anchor system that is reversible and is actuated without the need for tools.

BACKGROUND OF INVENTION

Optical fiber connectors are an essential part of practically all optical fiber communication systems. For instance, such connectors are used to join segments of fiber into longer lengths, to connect fiber to active devices such as radiation sources, detectors and repeaters, and to connect optical fiber to passive devices such as switches and attenuators. The principal function of an optical fiber connector is to couple optically a fiber with a mating device (e.g., another fiber, an active device or a passive device) by holding the end of the fiber such that the core of the fiber is axially aligned with an optical pathway of the mating device.

A fiber optic cable typically comprises a cable jacket containing a centrally-located buffered fiber. Frequently, the cable also comprises strength members surrounding the buffered fiber. The purpose of the strength members is to absorb any pulling forces applied to the cable, and thereby leave the buffered fiber isolated and unloaded from those forces.

An import aspect of terminating a fiber with a connector is to secure the cable to the connector. To this end, the buffered fiber is typically fixated to the connector housing. Further, if the cable comprises strength members, these members are captivated by the connector at certain points such that any load on the cable is transferred to the captivation points only and not to the fragile fiber strand. Typically, the cable strength members are crimped onto the backend of the connector housing. To do this, a crimp tool is used to crimp an eyelet over the strength members, thereby captivating the strength members between the eyelet and the backend of the connector housing. The eyelet is usually crimped with sufficient force such that it not only captivates the strength members, but also squeezes the backend of the connector housing around the buffered fiber. Thus, crimping the eyelet to the backend of the connector simultaneously secures the strength members and the buffered fiber to the connector. Such a crimp is permanent and cannot be reversed.

Although robust crimp eyelets have been developed that withstand high loading while minimizing fiber damage, Applicant has identified a number of potential shortcomings with them. First, a traditional crimp eyelet requires a crimping tool to crimp it on to the backend of the housing. The need for tools naturally involves an additional cost associated with acquiring them and replacement as loss happens frequently in the field. Aside from requiring a tool, this termination approach also tends to be cumbersome as the user must arrange the strength members over the backend of the housing and then hold the cable and connector in a precise position while crimping the eyelet. The cumbersome nature of this procedure can lead to error in the eyelet crimping, resulting in variations in the integrity of the crimp and possibly damage to the fiber. Complicating this problem is the fact that traditional eyelets are not reusable. Once the eyelet is crimped, it cannot be reversed. Consequently, if the optical performance is not acceptable after the fiber is terminated, the connector must be cut off and scrapped.

Therefore, there is a need for an improved approach for securing an optical cable to a connector that does not require a tool and that can be reversed if the termination of the fiber needs to be reworked. While some approaches have been developed that offer reversible captivation of the strength members, these approaches require the buffered fiber to be secured in a separate step. Applicant has therefore identified a need for a reversible, tool-less cable attachment approach that is flexible enough that it secures not only the buffered fiber, but also secures strength members if present in the cable. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention is directed to a reversible, tool-less cable anchoring system that is flexible enough that it secures not only the buffered fiber, but also strength members if present in the cable. The system involves a cooperating anchor and nut assembly. The anchor comprises threads, which facilitate tool-less and reversible interengagement with the nut, and a collet, which cooperates with the nut both to compress around the buffered fiber and to captivate strength members if present. Thus, the anchor interacts with the nut to simultaneously clamp the buffered fiber and captivate any strength members without the use of tools. Furthermore, reversing the threading process between the anchor and nut will allow the components to disengage without damage and the buffered fiber can be removed for inspection or reworking if needed.

The anchor assembly of the present invention is particularly useful for field termination because no tools are required and because the anchor connection is reversible. Such reversibility is important in field termination because the inherent variability of working in the field contributes to repeatability errors in the termination of the fiber, often resulting in substandard optical performance. Having the ability to rework the termination of a substandard optical connector, rather than scrap the entire connector, is a significant benefit.

Accordingly, one aspect of the invention is a connector having an anchor assembly that compresses the buffered fiber and captivates strength members. In one embodiment, the connector comprises: (a) a housing having a front and rear orientation; (b) an anchor at the rear of the housing, the anchor comprising exterior threads and a collet and defining at least a first passage configured to receive the buffered fiber; (c) a nut having internal threads and being adapted for threaded engagement with the anchor, and wherein the nut and collet cooperate to define an interference portion in which the nut deflects the collet inward to constrict the first passage as the nut is threaded onto the anchor.

In an alternative embodiment for terminating a Figure-8 optical fiber cable having two strength members on opposite sides of a fiber, the connector comprises: (a) a housing having a front and rear orientation; (b) an anchor at the rear of the housing, the anchor comprising exterior threads and a collet and defining at least a first passage configured to receive the fiber and second and third passages to receive the strength members; (c) a nut having internal threads and being adapted for threaded engagement with the anchor; and (d) wherein the nut and collet cooperate to define an interference portion in which the nut deflects the collet inward to constrict the second and third passages as the nut is threaded onto the anchor, thereby clamping the strength members.

Another aspect of the invention is a method for reversibly anchoring a cable to a connector. In one embodiment, the method comprises: (a) inserting the cable through a nut; (b) stripping and cleaving a buffered fiber in the cable; (c) after step (b), inserting the cleaved, stripped end of the buffered fiber through a first passage of an anchor disposed at the rear of the optical connector until the cleaved, stripped end reaches a certain point within the connector; and (d) screwing the nut onto the anchor such that the nut compresses a collet of the anchor to constrict the first passage and clamp the buffered fiber.

In an alternative embodiment for terminating a Figure-8 optical fiber cable having two strength members on opposite sides of a fiber, the method comprises (a) inserting the cable through a nut; (b) separating each strength members from the fiber and cleaving the fiber; (c) after step (b), inserting the cleaved, stripped end of the fiber through a first passage of an anchor disposed at the rear of the optical connector until the cleaved, stripped end reaches a certain point within the connector, and inserting each of the strength members into second and third passages in the anchor; and (d) screwing the nut onto the anchor such that the nut compresses a collet of the anchor to constrict the second and third passages and clamp the strength members.

Yet another aspect of the invention is an anchor assembly kit that can be combined with a connector in the field to anchor a cable to the connector reversibly and without the use of tools. In one embodiment, the anchor assembly kit comprises: (a) an anchor adapted for attachment to the rear of a connector housing, the anchor comprising exterior threads and a collet and defining at least a first passage configured to receive a buffered fiber; (b) a nut having internal threads and adapted for threaded engagement with the anchor, wherein the nut and collet cooperate to define an interference portion in which the nut compresses the collect to constrict the first passage as the nut is threaded onto the anchor.

In an alternative embodiment for terminating a Figure-8 optical fiber cable having two strength members on opposite sides of a fiber, the assembly kit comprises: (a) an anchor adapted for attachment to the rear of a connector housing, the anchor comprising exterior threads and a collet and defining at least first, second and third passages in which the first passage is configured to the fiber and the second and third passages are configured to receive the strength members; (b) a nut having internal threads and being adapted for threaded engagement with the anchor; and wherein the nut and collet cooperate to define an interference portion in which the nut compresses the collect to constrict the second and third passages as the nut is threaded onto the anchor.

BRIEF DESCRIPTION OF FIGURES

FIG. 1 shows a cutaway side view of one embodiment of the present invention in which the nut is in the process of being threaded onto the anchor.

FIG. 2 shows a cutaway side view of the nut in threaded engagement with the anchor.

DETAILED DESCRIPTION

Figure 3:
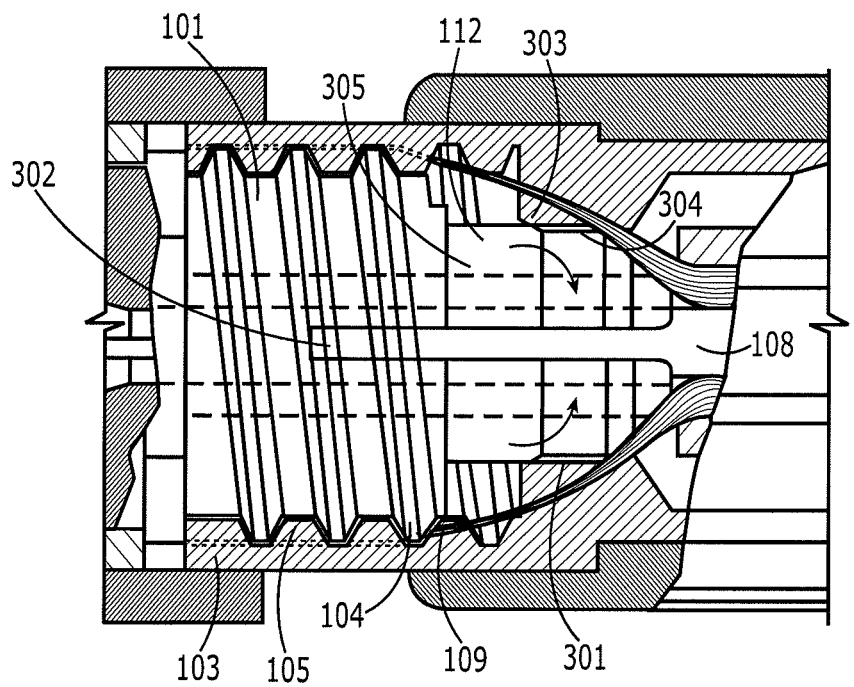
FIG. 3 shows a magnified view of the inter-engagement of the nut and the anchor of the present invention.

Referring to FIGS. 1-3, one embodiment of an optical fiber connector 100 of the present invention is shown. The connection 100 is configured for terminating an optical fiber cable 111 containing a buffered fiber 108. The connector comprises a housing 102 having a front and rear orientation. At the rear end of the housing 102 is disposed an anchor 101. The anchor 101 has exterior threads 104 and a collet 112, and defines at least a first passage 106. The buffered fiber 108 is disposed in the first passage 106. In threaded interengagement with the anchor 101 is a nut 103 having interior threads 105. The nut and collet are referred to collectively herein as the "anchor assembly" and they cooperate to define an interference portion 301 (see FIG. 3) in which the nut urges the collect inward to constrict the first passage, and thus clamp the buffered fiber, as the nut is threaded onto the anchor. These elements are discussed in greater detail below.

Throughout this description, the connector and anchor assembly are described with respect to a top/bottom and front/back orientation. It should be understood that reference is made to this orientation for purposes of illustration and to describe the relative position of the components within a given connector. It should therefore be understood that this orientation is not an absolute orientation and that rotating, inverting or otherwise altering the connector's position in space is possible without changing the relative position of the components of the connector.

Additionally, the anchor assembly of the present invention can be used in a variety of applications, including, for example, connectors and splices and its tool-less assembly lends itself to field installation applications. Although an SC-type connector embodiment of the present invention is described herein in detail, it should be understood that the present invention is not limited to an SC-type connector and may be practiced in any conventional or later-developed connector, including, for example, traditional ST and FC-type connectors, small form factor designs, such as, MU and LC connectors, and multi-fiber connectors such as the MTRJ, MPX, and MPO-type connectors. Furthermore, the clamping assembly of the present invention is not limited to connector applications, and may be used in any optical application requiring a cable to be secured to a structure. For purposes of simplicity, however, the description herein will focus mainly on the anchor assembly as used in a connector.

An important aspect of the present invention is the interaction of the anchor and the nut to secure the cable to the connector. The anchor and nut function to secure the cable to the connector in at least one of three ways: (1) by deflecting the collet inward to constrict the first passage and thereby clamp the buffered fiber in the first passage of the anchor; (2) by captivating the strength members of the cable between the threads of the anchor and the nut and between the nut and the collet at the interference portion; and/or (3) by captivating or clamping the strength members in passages in the anchor adjacent to the first passage. Each of these three approaches is described in greater detail below.

In one embodiment of the anchor assembly, the collet deflects inwardly to constrict the first passage as the nut is screwed onto the anchor. To this end, as shown in FIG. 3, the anchor assembly has an interference portion 301 at which the nut contacts the collet, and deflects the collet inward as the nut is screwed onto the anchor. Prior to the nut being screwed onto the anchor (i.e., pre-deflection), the first passage has a diameter greater than the buffered fiber, e.g., 900 microns. Once the nut is screwed in place (i.e., post-deflection), the collet compresses and the first passage is less than the diameter of the buffered fiber, e.g. less than 900 microns.

The interference portion may be embodied in the anchor assembly in different ways. For example, the nut may have a tapered portion such that as it is screwed onto the anchor the tapered portion contacts the collet, causing it to deflect inward. Alternatively, the collet and nut may be conically formed such that screwing the nut onto the anchor causes the tapered surfaces to interfere thus deflecting the collet inward. The above-mentioned tapers may be a continuous or stepped. Still other configuration of the interference portion will be obvious to one of skill in the art in light of this disclosure.

Referring to FIG. 3, a magnified view of the interaction between the anchor and nut of FIG. 2 is shown. As shown, the interference portion 301 comprises a tapered portion 303 of the nut 103 and a rearward portion 304 of the collet 112. As the tapered portion 303 interferes with the rearward portion 304 as when the nut 103 is screwed onto the anchor 101, the interfering force causes the compliant collet to deflect inward (as indicated by the arrows) constricting the first passage 106 as discussed above. Although a narrowed tapered portion 303 is shown in FIG. 3, it should be understood that other embodiments are possible.

As mentioned above, the collet is configured to deflect inward as a result of the interfering force at the interference portion 301. Accordingly, in one embodiment, the collet is compliant. Various approaches are known to render a collet compliant. For example, the collet may have mechanical features, such as slots, to define spring fingers that can be deflected inward using the nut. Alternatively, rather than the collet defining a number of slots to define spring fingers, the collet may comprise a number of discrete fingers that are bound together using a compliant material such as spring steal or an elastomer. Alternatively, rather than mechanical means of imparting compliance to the collet, the collet may comprise a compliant material which is capable of being deflected as the nut is screwed onto it. Suitable compliant materials include, for example, polymers, composites, metal (if deflected). On the other hand, an embodiment option could be if the collet fingers have elastomeric O-rings or grommets seated on internal ID in grooves within the fingers, such that finger deflection will cause the O-rings to clamp around the buffered fiber, and assist in the reversal by means of their internal spring memory when the deflecting force is removed.

In the embodiment shown in FIG. 3, a mechanical approach is used. Specifically, the collet 112 comprises slots 302 to define spring fingers 305. The interference portion 301 is located at the free end of each of the spring fingers 305 such that as the nut 103 is screwed onto the collet 101 the urging force at the interference portion 301 causes the spring fingers 305 to deflect inwardly thereby clamping the buffered fiber 108.

The second approach for securing the cable to the connector is by captivating strength members (a) between the threads of the anchor and the nut and (b) at the interference portion. For example, referring to FIG. 3, strength members 109, which typically comprise aramid or para-aramid synthetic fibers, such as Kevlar® fiber, are disposed around the anchor and external threads 104 prior to the nut being screwed on as shown in FIG. 1. After the nut is screwed onto the anchor, the fibers are captivated between the threads 104 and 105 of the collet 101 and nut 103, and between the collet and the nut at the interference portion 301 as shown in FIG. 3. Therefore, in the embodiment shown in FIG. 3, the buffered cable 111 is secured to the connector 100 housing 102 using two mechanisms—first, the clamping force of the collet on the buffered fiber, and, second, the captivation of the strength members 109 between the threads 104, 105 and at the interference portion 301.

Figure 7:
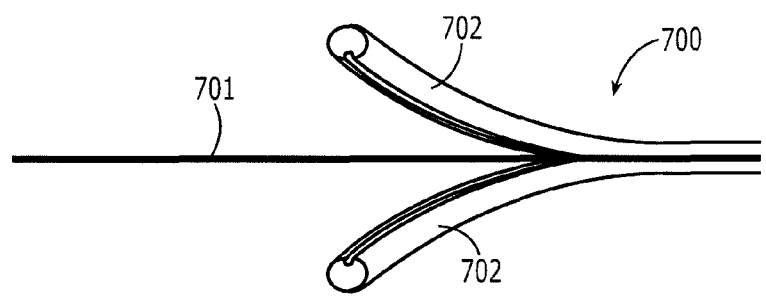
FIG. 7 shows a prior art Figure-8 type cable.

In yet another embodiment of the anchoring assembly of the present invention, a third approach for securing strength members to the housing is used in which additional passages in the anchor are used to clamp strength members of a cable. For example, in certain applications, "Figure-8" type cable is used, in which two wire strength members run parallel to the fiber on either side of a 250 um buffered fiber. Referring to FIG. 7, a prior art Figure-8 type cable 700 is shown. The cable 700 comprises a buffered fiber 701 fixed between the two separated strength members 702, which are encased in a polymeric coating. When the strength members are not separated, the buffered fiber is fixed relative to these members within the polymeric coating. At termination, the strength members are separated a certain distance to expose the 250 um fiber, which can be stripped for the termination. (In this image, the terminal end of the buffered fiber 701 has been stripped of its polymeric coating.) Such Figure-8 type cables are well known.

Figure 8:
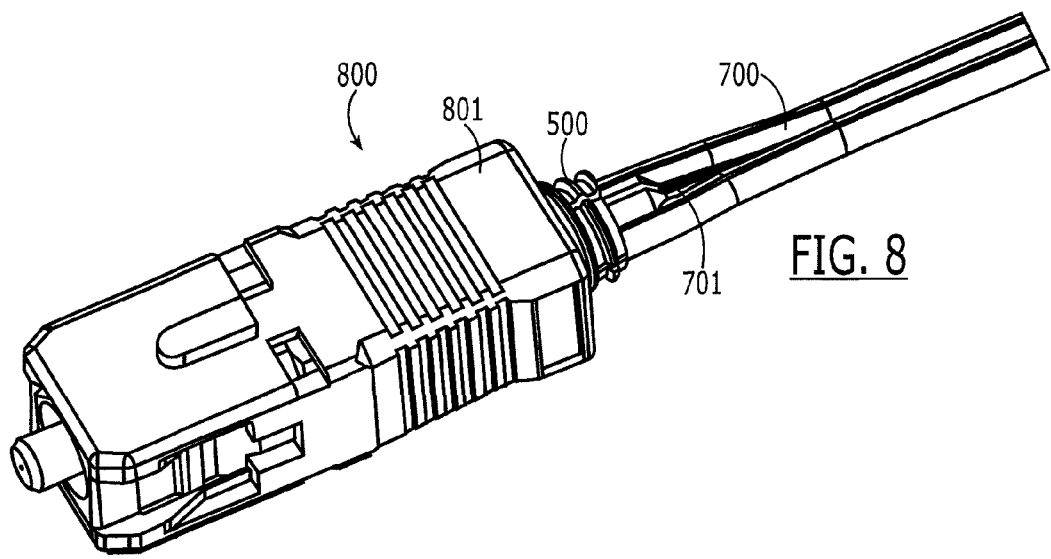
FIG. 8 shows a connector of the present invention in which a Figure-8 type cable is terminated.

To accommodate the strength members of Figure-8 type cables, in one embodiment, an alternative collet configuration is used having multiple passages in the anchor. For example, referring to FIG. 5, one embodiment of an anchor 500 for accommodating Figure-8 type cables is shown. The anchor 500 comprises a first passage 501 through which the buffered fiber passes as described above, and second and third passages 502 and 503, in which the strength members 702 are disposed. FIG. 6 shows a different perspective view of the collet of FIG. 5.

Figure 5:
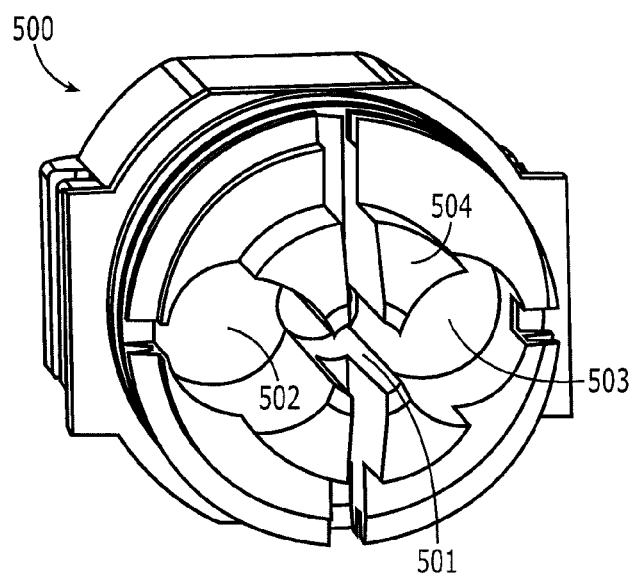
FIGS. 5 and 6 show perspective views of an alternative embodiment of the anchor of the present invention.
Figure 6:
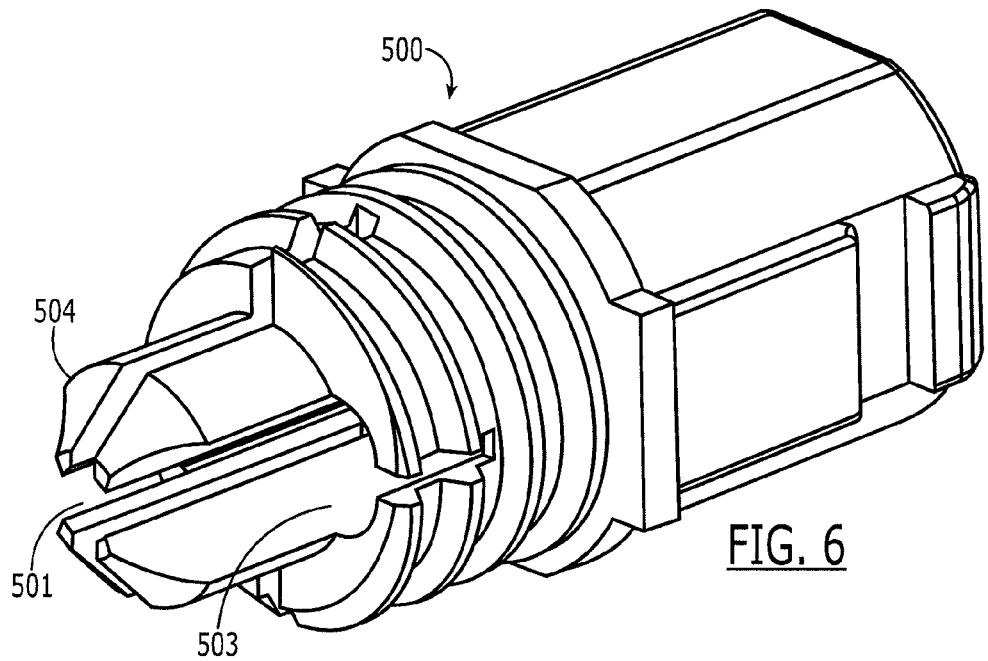
Figure 9:
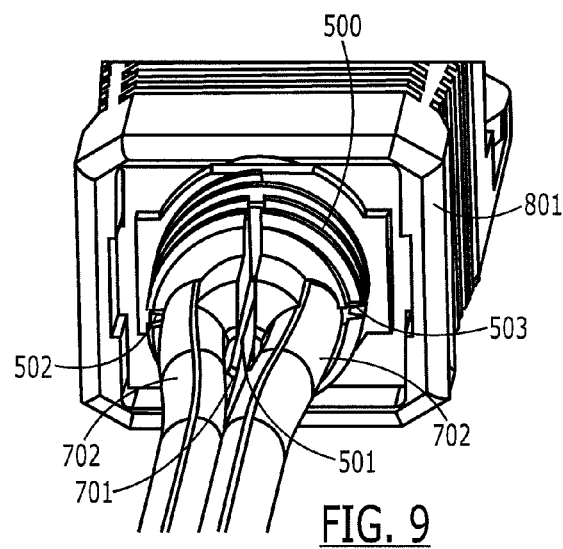
FIG. 9 shows a rear view of the connector of FIG. 8.

Referring to FIG. 8, a connector 800 is shown to which the anchor 500 of FIG. 5 is attached. In this particular embodiment, an SC connector is shown, however, it should be understood that the present invention is not limited to SC connectors as mentioned above. The Figure-8 type cable 700 of FIG. 7 is disposed in the anchor 500 as shown in FIG. 9, which is a rearview of the connector 800 shown in FIG. 8. From this view, it is clear that the strength members 702 of the cable 700 are disposed in the second and third passages 502, 503. The buffered fiber 701 runs through the first passage 501. It is worth noting that the cable in connector 800 shown in FIGS. 8 and 9 is not yet secured to the connector, as a nut has not been screwed onto the anchor to deflect the collet 504 inward.

Figure 10:
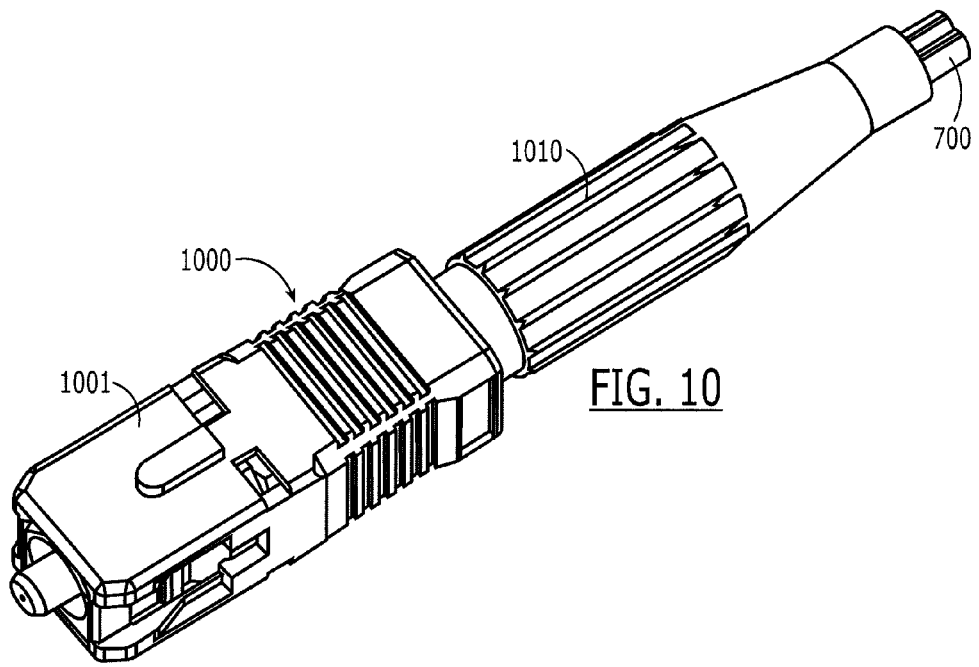
FIG. 10 shows the connector of FIG. 8 completed with a boot.

Referring to FIG. 10, a complete connector 1000 is shown in which a nut/boot assembly 1010 is in threaded engagement with the anchor of the connector 800 shown in FIGS. 8 and 9. When the nut/boot assembly 1010 is screwed onto the anchor 500, the collet 504 simultaneously constricts the first, second and third passages 501, 502, 503 (see FIG. 9), thereby clamping and securing the strength members 702 which holds the 250 um buffered fiber in a fixed axial position. Therefore, in the embodiment of FIG. 10, the cable 700 is secured to the housing 1001 of connector 1000 by the collet clamping the strength members 702 in the second and third passages 502, 503, and, thus, the buffered fiber 701 is held by the clamped cable 700.

Figure 11:
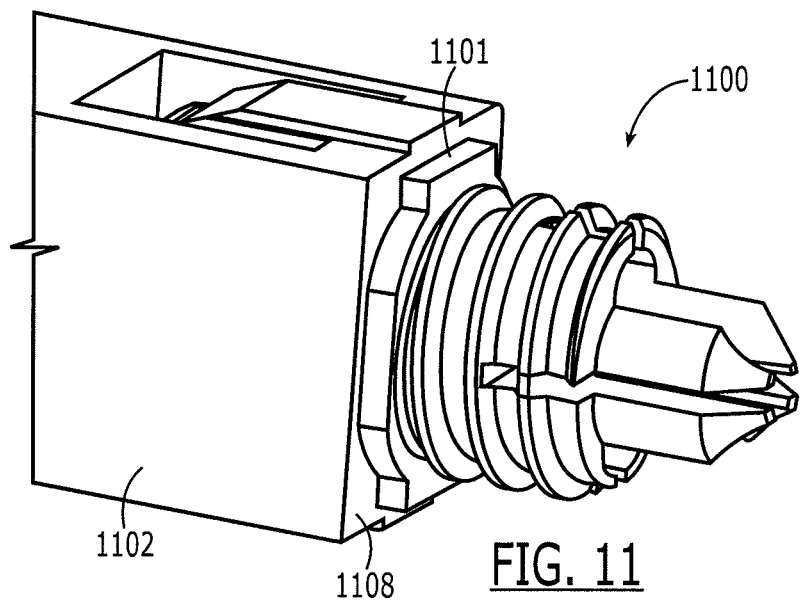
FIG. 11 shows an embodiment of the anchor of the present invention snapped into the rear of a housing of the connector.
Figure 12:
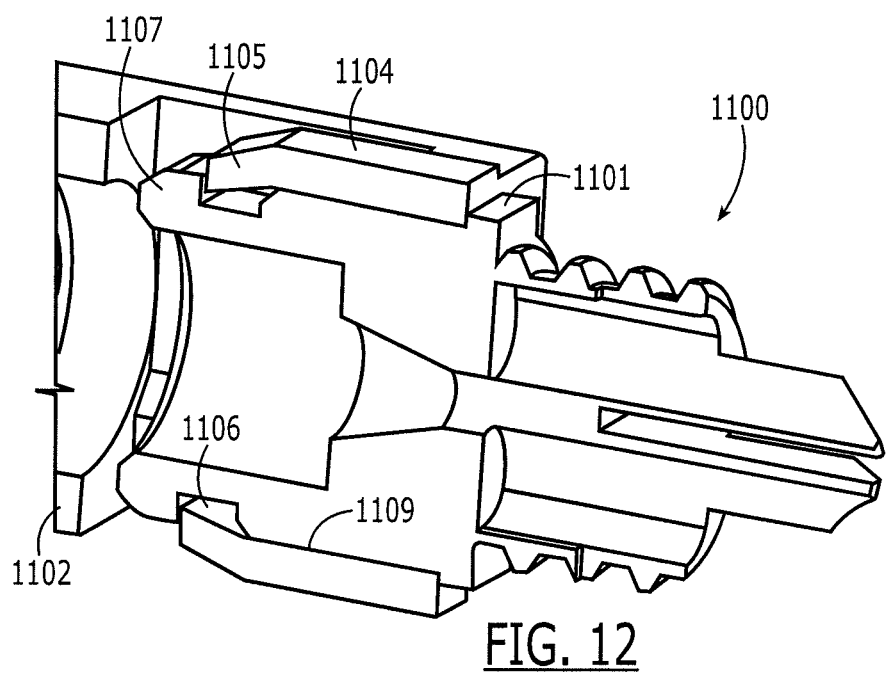
FIG. 12 shows a cutaway side view of the anchor of FIG. 11.

Referring to FIGS. 11 and 12, the connection of the anchor 1100 to the housing 1102 is described. Generally speaking, the anchor can be attached to the housing of the connector in a variety of different ways, including, for example, by mechanically fastening the anchor to the housing (e.g., by threaded or snapping engagement), by adhering the anchor to the housing, or by integrally molding the anchor to the housing.

In the embodiment shown in FIGS. 11 and 12, the anchor 1100 is mechanically interengaged with the housing 1102 with snapping engagement. In this particular embodiment, a cantilevered tab 1104 is defined having a free end 1105. Because the tab is cantilevered, the free end 1105 tends to be compliant. Cooperating with the tab 1104 and free end 1105 is a recess 1106 in the anchor 1100 to receive the tab 1104. As the anchor 1100 is inserted into the rear of the housing 1102, the cantilever tab 1104 is pushed outward until the anchor 1100 reaches a certain position, at which point the recess 1106 aligns with the free end 1105 and the free end 1105 is received in the recess 1106, allowing the tab 1104 to return to its normal position, thereby interlocking the anchor 1100 with the housing 1102. To facilitate urging the cantilever tab 1104 outward while the anchor 1100 is being inserted into the housing, a tapered leading edge 1107 on the anchor may be used.

Although FIGS. 11 and 12 show an embodiment in which the resilient tab is located on the housing, it should be understood that this configuration may be reversed and the resilient tab may be located on the anchor and the recess for receiving the tab may be located inside of the housing. In such a configuration, the resilient tab would deflect inwardly, inside the anchor, as the anchor is inserted into the housing. Still other snapping or mechanical interlock mechanisms will be obvious to one of skill in the art in light of this disclosure.

In the embodiment shown in FIGS. 11 and 12, the anchor also comprises a flange 1101, which is configured to butt up against the end wall 1108 of the housing 1102 when the anchor is in its certain position. Furthermore, in the embodiment show in FIGS. 11 and 12, the anchor has two opposing parallel flats 1109 which fits closely with corresponding flats in the rear portion of the housing. In the particular embodiment shown, another two opposing parallel flats are disposed at 90 degree offset relative to the flats 1109. The purpose of these are to prevent a tilt during cable side pull. The flange 1101 and the flats 1109 enhances the rigidity of the anchor and, in particular, improves the anchor's resistance to lateral and transverse forces.

Figure 4:
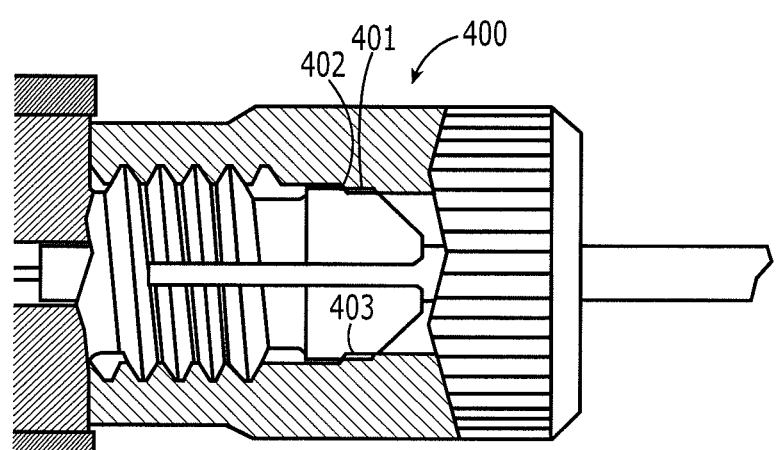
FIG. 4 shows an alternative embodiment of the nut of the present invention.

With respect to the nut, a variety of different embodiments may be used. For example, referring to FIG. 1, an embodiment is shown in which the nut 103 is combined with a strain relief boot 110 as shown. (See also FIG. 10 in which the nut and boot are combined in a common assembly 1010.) Such a combination may be achieved by adhering the nut to the boot or by integrally molding the nut with the boot. Still other nut configurations are possible, for example, in backplane applications, where space is limited, a shortened nut having no boot may be preferable. For example, referring to FIG. 4, a cutaway view of such a nut 400 is shown. The cutaway of the nut indicates a shortened design, although the features of the nut 400 including the interference portion 401 comprising a narrowed portion 403 of the nut for contacting a corresponding portion 402 of the collet are still present.

As mentioned above, the anchor assembly of the present invention is particularly useful for field termination because no tools are required and because the anchor connection is reversible. Such reversibility tends to be more important in field termination because the inherent variability of working in the field contributes to repeatability errors in the termination of the fiber, often resulting in substandard optical performance. Having the ability to rework the termination of a substandard optical connector rather than scrap the entire connector is a significant benefit. The anchor assembly of the present invention may be used in combination with any know field installable connector design, such as those disclosed in U.S. Pat. No. 7,331,719 (hereby incorporated by reference), but is particularly effective when combined with a reversible field installable connector, such as that disclosed in U.S. patent application Ser. No. 13/115,615, filed concurrently herewith (hereby incorporated by reference). Coupling the reversibility of the anchor assembly with a reversible bare fiber clamping mechanism allows the connector to be re-terminated repeatedly until the desired optical performance is achieved.

Referring to FIG. 1, terminating a fiber to a field-installable connector involves sliding the nut 103 or the nut in combination with the boot 110 on the cable 111. Next, the end of the buffered fiber is prepared by removing the buffer from the bare fiber and cleaving the end to produce a smooth low loss facet to optically couple with another fiber. This is a well-known process. The terminating fiber may or may not have a jacket. In one embodiment, the terminating fiber comprises a 125 um glass fiber covered by a 250 um protective primary polymeric buffer 113. Over this coating is another polymeric buffer layer, typically 900 um in diameter. (It is understood that the dimensions and the materials may vary.) In another embodiment, the terminating fiber is a hard coated fiber in which the primary buffer is replaced by a hard coating. Examples of hard coatings include hard polymer, silica, metal coatings.

In one embodiment, only the distal tip of the fiber is stripped down to bare fiber. More specifically, a length of terminating fiber is stripped down to the primary buffer 113 to form a stripped portion and then just the distal end of the stripped portion is further stripped down to bare fiber. Such an approach offers several benefits. For example, clamping the stripped portion, rather than the bare portion, in the connector's clamping mechanism (See, e.g. U.S. application Ser. No. 13/115,615) may offer better retention against axial pull on the terminating fiber. Furthermore, the primary buffer also serves to protect the bare fiber from environmental factors such as, for example, moisture. Therefore, limiting the length of the bare portion, limits the fiber's exposure to environmental factors. Yet another benefit of leaving the primary buffer intact is that, in one embodiment, the primary buffered fiber is used to created a buckle/bend, which, after the outer buffer is clamped to the connector, provides a constant forward urging force on the fiber end to secure physical contact with the fiber stub at all times especially during environmental changes (see, e.g. U.S. application Ser. No. 13/115,615). In this respect, the stripped portion will provide a greater forward urging force than the bare fiber portion because it is stiffer.

The exposed fiber end is then cleaved to produce a smooth low loss facet to optically couple with another fiber (not shown). This is a well-known process. The buffered fiber 108 (with the stripped tip) is then inserted in the first passage 106 of the anchor 101 and pushed forward in a fiber channel. In one embodiment, the fiber is pushed along the fiber channel until it contacts the back end face of the fiber stub (not shown). Alternatively, in embodiments in which there is no fiber stub, the fiber is pushed through a ferrule (not shown) to the ferrule end face wherein the end of the fiber is positioned to be flush with the end face of the ferrule.

Next, a clamping mechanism of the connector is used to secure the bare portion or the stripped portion of the fiber to the connector. Although the bare fiber may be secured in the connector, the bare fiber tends to be too delicate to secure the entire cable to the connector. That function is provided by the anchor assembly of the present invention. In yet another embodiment, the fiber with the outer buffer is secured by the clamping mechanism.

If the cable has strength members that encircle the buffered fiber as in cable 111, then the strength members are arranged around the exterior threads 104 of the anchor. Next, the nut 103 is screwed on the exterior threads, thereby simultaneously captivating the strength members between the threads of the anchor and nut and the interference portion 301 (see FIG. 3), and clamping the buffered fiber in the first passage 106 by squeezing the collet 112 around it.

If a Figure-8 type cable is used, then the anchor 500 shown in FIG. 5 would be used. Rather than arranging the strength members around the external threads 104, the strength members 702 would be inserted in the second and third passages 502, 503 before the nut/boot combination 1010 (FIG. 10) is threaded on to the anchor 500. When the nut/boot combination 1010 is threaded onto the anchor, it squeeze the collet closed, thereby clamping the strength members in their respective passages.

Next, the optical performance of the connector is tested to ensure the optical performance is acceptable. If the desired optical performance is not achieved, the above-mentioned assembly process is essentially reversed and a new termination re-attempted. Specifically, the nut is unscrewed and the connector unactuated to release the bare fiber. At this point, it is generally preferred that the terminating fiber be re-cleaved and stripped to provide a fresh terminating end.

At this point, the above-mentioned process is repeated until the desired optical performance is achieved. Although performance may vary, in one embodiment, the connector is configured such that at least five termination attempts are possible.

Therefore, the reversible features of the anchor/nut assembly of the present invention combined with a reversible field installable connector, allows the installer to re-terminate the fiber to the connector if the optical performance provides proof to be non-satisfactory. Instead of having to cut off a poor-performing connector, the mechanical fiber splice can be released allowing the fiber to be removed. The fiber can then be re-cleaved and reinserted into the connector and retested. This reduces the termination time, saves connector usage and tooling costs, and requires fewer components than traditional connector designs. It should be apparent from the above description that the clamping mechanism of the present invention provides for significant advantages over conventional field-installable configurations such as reversibility, lower cost and simplicity in manufacturing.

What is claimed is:

1. An optical fiber connector for terminating an optical fiber cable containing a buffered fiber and strength members, said connector comprising:
   a housing having a front and rear orientation;
   an anchor at the rear of said housing, said anchor comprising exterior threads and a collet and defining at least a first passage configured to receive said buffered fiber; and
   a nut having internal threads and being adapted for threaded engagement with said anchor,
   wherein said nut and collet cooperate to define an interference portion in which said nut deflects said collet inward to constrict said first passage as said nut is threaded onto said anchor, and
   wherein the strength members are captivated at the interference portion between said nut and said collet as said nut is threaded onto said anchor.

2. The connector of claim 1, wherein said first passage has a pre-deflection diameter greater than the diameter of a buffered fiber and a post-deflection diameter less than said diameter of said buffered fiber.

3. The connector of claim 2, wherein said diameter of said buffered fiber is 900 microns.

4. The connector of claim 1, further comprising said optical fiber cable containing a buffered fiber and strength members.

5. The connector of claim 4, wherein said strength members are captivated between the threads of said collet and said nut and in said interference portion.

6. The connector of claim 1, wherein said nut is combined with a boot.

7. The connector of claim 1, wherein said interference portion comprises a tapered portion of said nut.

8. The connector of claim 1, wherein said anchor is discrete from said housing.

9. The connector of claim 8, wherein said anchor snaps into the rear of said housing.

10. The connector of claim 9, wherein said housing comprises a resilient tab and said anchor comprises a recess such that, as said anchor is inserted into said rear of said housing, said resilient tab is urged outward until said anchor reaches a certain position, at which point said resilient tab snaps into said recess, thereby securing said anchor to said housing.

11. The connector of claim 8, wherein said housing has a rear portion for receiving said anchor, said anchor having at least one flat surface to cooperate with a corresponding flat surface on rear portion to prevent angular tilt of said anchor relative to said rear portion.

12. The connector of claim 11, wherein said anchor has at least two parallel flats fitting closely within corresponding parallel tracks in said rear portion to prevent relative said angular tilt.

13. The connector of claim 1, wherein said anchor has a flange for contacting a rear portion of said housing when said anchor is in said certain position.

14. An optical fiber connector for terminating a Figure-8 optical fiber cable having two strength members on opposite sides of a fiber, said connector comprising:
   a housing having a front and rear orientation;
   an anchor at the rear of said housing, said anchor comprising exterior threads and a collet and defining at least a first passage configured to receive said fiber and second and third passages to receive said strength members;
   a nut having internal threads and being adapted for threaded engagement with said anchor; and
   wherein said nut and collet cooperate to define an interference portion in which said nut deflects said collet inward to constrict said second and third passages as said nut is threaded onto said anchor, thereby clamping said strength members.

15. A method of anchoring a cable to an optical connector, said method comprising:
   (a) inserting said cable through a nut;
   (b) stripping and cleaving a buffered fiber in said cable;
   (c) after step (b), inserting the cleaved, stripped end of said buffered fiber through a first passage of an anchor disposed at the rear of said optical connector until the cleaved, stripped end reaches a certain point within the connector;
   (d) arranging strength members of said cable at an interference portion defined by said nut and a collet of said anchor; and
   (e) screwing said nut onto said anchor such that said nut compresses said collet of said anchor to constrict said first passage and clamp said buffered fiber and such that said strength members are captivated at the interference portion between said nut and said collet.

16. The method of claim 15, wherein step (c) further comprises: arranging strength members of said cable around external threads of said anchor, such that, when said nut is screwed onto said anchor, said strength members are captivated between the threads of said anchor and said nut and between said nut and said collet at the interference portion.

17. The method of claim 15, wherein, prior to step (c), said anchor is snapped into the rear of a connector housing.

18. The method of claim 15, further comprising step (f) unscrewing said nut and removing said buffered fiber if the termination of the buffered fiber in the connector is not satisfactory and repeating steps (b)-(e).

19. A method of anchoring a Figure-8 cable to an optical connector, said Figure-8 cable having two strength members on opposite sides of a fiber, said method comprising:
 (a) inserting said cable through a nut;
 (b) separating each strength members from said fiber and cleaving said fiber;
 (c) after step (b), inserting the cleaved, stripped end of said fiber through a first passage of an anchor disposed at the rear of said optical connector until the cleaved, stripped end reaches a certain point within the connector, and inserting each of said strength members into second and third passages in said anchor; and
 (d) screwing said nut onto said anchor such that said nut compresses a collet of said anchor to constrict said second and third passages and clamp said strength members.

20. An anchor assembly kit comprising:
 an anchor adapted for attachment to the rear of a connector housing, said anchor comprising exterior threads and a collet and defining at least a first passage configured to receive a buffered fiber of an optical fiber cable;
 a nut having internal threads and being adapted for threaded engagement with said anchor; and
 wherein said nut and collet cooperate to define an interference portion in which said nut compresses said collet to constrict said first passage, and at which strength members of the optical fiber cable are captivated at the interference portion between said nut and said collet, as said nut is threaded onto said anchor.

21. The kit of claim 20, wherein said anchor is adapted for snapping engagement with the rear of said connector housing.

22. An anchor assembly kit comprising:
 an anchor adapted for attachment to the rear of a connector housing, said anchor comprising exterior threads and a collet and defining at least first, second and third passages in which said first passage is configured to receive a fiber of a Figure-8 optical fiber cable and said second and third passages are configured to receive strength members of the Figure-8 optical fiber cable;
 a nut having internal threads and being adapted for threaded engagement with said anchor; and
 wherein said nut and collet cooperate to define an interference portion in which said nut compresses said collet to constrict said second and third passages as said nut is threaded onto said anchor.

* * * * *